United States Patent [19]
Piccirilli et al.

[11] Patent Number: 4,693,846
[45] Date of Patent: Sep. 15, 1987

[54] URETHANE-MODIFIED ROSIN ESTERS

[75] Inventors: Robert M. Piccirilli; Roger M. Christenson, both of Gibsonia; Frederick A. Falk, Pittsburgh; Joseph M. Makhlouf, Mars, all of Pa.

[73] Assignee: PPG Industries, Inc., Pittsburgh, Pa.

[21] Appl. No.: 861,171

[22] Filed: May 9, 1986

[51] Int. Cl.$^4$ ............................................. C08L 93/04
[52] U.S. Cl. ....................................... 260/97; 106/29; 106/30; 260/104
[58] Field of Search .................... 260/97, 104; 106/29, 106/30

[56] References Cited

U.S. PATENT DOCUMENTS

| | | | |
|---|---|---|---|
| 2,947,714 | 8/1960 | Leclercq et al. | 260/97 |
| 3,692,720 | 9/1972 | Sloan | 260/24 |
| 4,075,143 | 2/1978 | Schelhaas et al. | 106/30 |
| 4,148,767 | 4/1979 | Spicer et al. | 260/22 TN |
| 4,337,510 | 3/1983 | Ruckel et al. | 260/97 |

Primary Examiner—Morton Foelak
Attorney, Agent, or Firm—Godfried R. Akorli

[57] ABSTRACT

The present invention encompasses a urethane-modified rosin ester which is derived from an isocyanate and a hydroxyl-functional rosin esterification product of a dimerized rosin. The urethane-modified rosin esters, having a high softening point and good compatibility with hydrocarbon solvents, good gelability and good squalene resistance, are particularly suitable as binders for inks such as fast conversion lithographic inks.

11 Claims, No Drawings

URETHANE-MODIFIED ROSIN ESTERS

BACKGROUND OF THE INVENTION

1. Field of the Invention.

The present invention relates to modified rosins which are useful as binders in printing inks and coating compositions. More specifically, the present invention relates to urethane-modified esters of rosins and their use in lithographic printing inks.

2. Brief Description of the Prior Art

Rosins have been generally disclosed for use as binders in lithographic printing inks. Of particular interest here are the performance properties of lithographic printing inks, after they have been successfully applied to printed matter such as magazine covers. More specifically, the concern here is for squalene resistance. Printed ink is considered squalene resistant if there is no noticeable change in the dried printed ink when it is contacted with squalene. This demonstrates the ability of the ink to withstand lubricant matter secreted by, say, the sebaceous glands of the skin.

Generally, lithographic inks are used in printing processes that employ planographic plates to separate image from non-image areas. The image areas are preferentially wet by ink, and the non-image areas are preferentially wet by an aqueous fountain solution. During printing, the ink must remain sufficiently stable to transfer properly; yet the printed ink must rapidly dry to a solid.

Lithographic ink binders are selected on the basis that will ensure the attainment of all of the above properties. For example, the working properties of the inks can be ensured by controlling the extent to which the ink, by virtue of its binder, and an aqueous fountain solution interact to form a water-in-ink emulsion. The working and/or printing properties on the press at the prevailing press speed can be affected by this interaction. Generally, the ink must be sufficiently viscous in order to transfer without misting. Yet, it must not be so tacky as to effect picking off the printed matter, hence it must have good solubility in the appropriate solvents. Also, the printed ink must dry rapidly and in this case must have good squalene resistance.

As can be seen from the foregoing, the selection or the preparation of ink ingredients, and in this case the ink binder, that will meet the above requirements is a difficult task. By this invention, one such type binder and inks formulated therewith are provided.

SUMMARY OF THE INVENTION

In accordance with the foregoing, the present invention encompasses a urethane-modified rosin ester comprising a reaction product of:
(a) a hydroxy-functional rosin esterification product of:
  (i) an acid functional reactant comprising a rosin polyacid,
  (ii) a polyfunctional alcohol;
(b) an isocyanate.

The urethane-containing resins of this invention preferably have a softening point greater than 110° C., good dilutability in hydrocarbon solvents and good reactivity with gellants such as aluminum alkoxides, aluminum chelates, oxyacylates, and the like.

The present invention further encompasses ink formulations comprising the urethane-modified rosin esters. The invention also encompasses processes for printing on substrates such as paper by applying the ink formulations to the surface of the substrates and drying the same. Printed matters obtained thereby are also encompassed by the invention.

It has been found that the ink formulations have excellent application properties, excellent press performance and quality printing. Printed inks derived therefrom have fast dry, high gloss, rub resistance, squalene resistance and other desirable ink properties.

DETAILED DESCRIPTION OF THE INVENTION

The hydroxy-functional rosin esterification products useful herein can be prepared by using an acid functional reactant described hereinbelow. The acid functional reactant useful herein comprises a rosin polyacid as described herein. In accordance with this invention, the rosin polyacid comprises at least two carboxyl groups. Typically, the rosin polyacid is obtained from rosins which are solid resinous materials derived from oleoresins or stump wood of pine trees. Generally, the rosins contain monoacid compounds which are typically abietic (carboxylic) acid and/or isomers thereof, as well as smaller amounts of non-acid compounds. The monoacid compounds of the rosins are herein referred to as rosin monoacids.

The rosin polyacids comprise dimerized rosins. The term dimerized rosin is used to refer to dimer acids of the afore-described rosin which can be prepared by the acid catalyzed reaction of the rosin. Illustratively, dimerized rosins can be prepared by "polymerizing" the rosin by the action of an alkyl or metal halide such as boron trifluoride or an inorganic acid such as sulfuric acid, at essentially room temperature over an extended period of time. The end result is a mixture comprising dimer acids of the rosin, the monoacid compounds, and the non-acid compounds. This mixture is also sometimes referred to in the art as "polymerized" rosins. Generally, these "polymerized" rosins comprise from about 20 to 60 percent of the dimerized rosin. The mixture can be further enriched in its dimerized rosin content by, say, removal of some of the rosin monoacid. Dimerized rosins or "polymerized" rosins are commercially available as DYMEREX and POLYPALE available from Hercules Inc. or SYLVATAC 140, 115, or 95, available from Sylvachem Co.

In accordance with this invention, the dimerized rosin is present in an amount sufficient to impart the necessary softening point to the instant urethane-modified rosin ester without adversely affecting the dilutability thereof. Typically, the "dimerized" rosin is present in amounts of about 15 to 85 percent by weight based on the weight of the acid functional reactant. The amount of the dimerized rosin can be measured by gel permeation chromatography using, say, polystyrene standard by using the area of the dimerized rosin peak in relation to the total area under all the peaks of the chromatogram.

In measuring the weight percent dimerized rosin using the polystyrene as the standard, a Waters Associates gel permeation chromatograph Model 201 was used. Six μ-Styragel columns can be used. Each column has the dimensions of 30 centimeters long and 7.8 millimeters inside diameter. A differential refractometer is used as detector, and the columns are arranged according to their pore size on the order of $10^6$-$10^5$-$10^4$-$10^3$-500-100 Angstroms with the $10^3$ Angstrom column being the first one. Tetrahydrofuran is used as a solvent with a flow rate of 2.0 milliliters/minute. The quality of the columns is checked by their "theoretical plate number" determined from orthodichlorobenzene and those columns with theoretical plate numbers greater than 3000/30 cm are used.

To determine weight percent dimerized rosin by gel permeation chromatography (GPC), the instrument is first calibrated using a polystyrene standard. Polystyrene standards used were purchased from Pressure Chemicals Company, Pittsburgh, Pa., and Waters Associates. The polystyrene standards have dispersities (dispersity= weight average molecular weight/number average molecular weight) ranging from 1.05 to 1.10. The weight average molecular weights of the polystyrene standards used were 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.25 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard normally used is 4,000 and the calibration curve beyond that was extrapolated down to 100. The upper and lower exclusion limits of this set of columns are 5,000,000 and 100, respectively, in terms of polystyrene molecular weight. The sample whose dimerized rosin content is to be determined is prepared as a 1.0 percent tetrahydrofuran solution. After filtration through a 0.5 micron filter, available from Gehman Corporation, Catalog No. 4219, a 0.25 ml sample size was injected into the columns and a GPC chromatogram obtained under the same experimental conditions as the calibration.

Percent dimerized rosin =

$$\frac{\text{Area of dimerized rosin peak}}{\text{Sum of the area of all the peaks}} \times 100$$

The percent dimerized rosin calculated is based on the assumption that the same weight response is given for all the components of the "polymerized" rosin. The dimerized rosin peak typically appears at a polystyrene number of about 350–450. The rosin monoacid peak appears at about 150–200.

Rosin polyacids otherwise prepared which are of the nature of the afore-described dimerized rosin, can be employed in accordance with the invention and are intended to be encompassed hereby. A typical example of the rosin polyacid is a maleinized rosin. Maleinization of the rosin can be done before, during or after the rosin has been esterified. Maleinization of the rosin entails reacting it with maleic anhydride or equivalents thereof by, say, a Diels-Alder reaction. Other than maleic anhydride, unsaturated carboxylic acids, preferably alpha, beta-unsaturated dicarboxylic acids or functional equivalents thereof, e.g., fumaric acid, itaconic acid or itaconic anhydride, can be employed.

Other acids can be employed in combination with the rosin polyacids. Illustratively, polybasic acids such as dimer fatty acid; and yet others such as sebacic, isophthalic, adipic acids and the like can be employed. Other monoacids such as fatty acids can be employed. It is desired to point out that functional equivalents of the acids described hereinabove, where available and efficacious, can be employed as well. Non-limiting examples of the equivalents can be esters, anhydrides, chlorides and the like. It is also desired to point out that in effect the use of acids other than the rosin polyacids may modify some of the desirable properties such as softening point of the urethane-modified rosin ester of the invention. Therefore, the skilled artisan should select the type and/or amount of the other acids accordingly.

Polyfunctional alcohols are reacted with the acid functional reactant, in the preparation of the rosin esterification product. The polyfunctional alcohols useful herein are preferably polyhydric alcohols. The polyhydric alcohols are preferably high functional polyols. By high functional polyols is meant those polyols containing more than two hydroxyl groups which will react with the acid functional reactants to produce rosin esters having high softening points and good dilutability with hydrocarbon solvents. The polyol may contain substituents provided that the substituents do not adversely affect the reaction of the polyols or the performance of the resultant products, in accordance with this invention. Illustrative examples of these polyols are mono- or poly-pentaerythritol such as di- or tri-pentaerythritol. Yet other examples of the useful polyols are trimethylolpropane, trimethylolethane, glycerine and the like. Other examples of polyfunctional alcohols are those alcohols containing at least one hydroxyl group and another functional group that can react with the acid functional group of the rosin. Non-limiting examples thereof can be aminoalcohols.

In the preparation of the hydroxyl-functional esterification product, the particular reactants and reaction conditions that are used will dictate the particular ratio of reactants. The reactants are employed in such a ratio that the resultant esterification product is hydroxyl-functional. Typically, the equivalent ratio of the acid functional reactant to the polyol can be from about 0.8:1.2 to 1:1.2. The reaction can be conducted at temperatures of 200° C. to 300° C. and preferably 250° C. to 300° C. until a desired acid value and/or hydroxyl value is attained. Lower temperature can be employed, but the rate of reaction will be slowed thereby. Also, higher temperature can be employed, but not above the point at which distillation of reactants or the final product will result. Solvents such as azeotropic solvents such as toluene or xylene or high boiling hydrocarbons can be employed. Catalysts such as condensation catalysts, e.g., dibutyltin oxide or butyl stannoic acid can also be employed in the reaction. The reaction can be conducted in a vessel properly equipped with, say, a thermometer, stirrer, and a distillation column to separate water that distills from reactants, and optionally a Dean Stark trap. The resultant ester of the polymerized rosin generally has a high softening point and good dilutability in appropriate hydrocarbon solvents.

The isocyanates useful herein are preferably polyfunctional isocyanates such as polyisocyanates. Non-limiting examples of the polyisocyanates are diisocyanates such as 4,4'-diphenylmethane diisocyanate, polymerized 4,4'-diphenylmethane diisocyanate, 1,3-phenylene diisocyanate, 1,4-phenylene diisocyanate and tolylene diisocyanate, 1,4-tetramethylene diisocyanate and 1,6-hexamethylene diisocyanate, 1,4-cyclohexyl diisocyanate, isophorone diisocyanate, alpha, alpha-xylylene diisocyanate, 4,4'-methylene-bis(cyclohexylisocyanate) and a mixture thereof. Higher functional isocyanates such as biurets of hexamethylene diamines can be used, or a triisocyanate derived from isophorone diisocyanate. Prepolymers of the isocyanates such as described above can be used. Also, monofunctional isocyanates can be employed preferably in admixtures with the polyisocyanates.

In preparing the urethane-modified rosin esters of this invention, the isocyanate is reacted with the hydroxy-functional rosin esterification product as follows. The amount and type of isocyanate and hydroxy-functional rosin esterification product must be such as would avoid gelation of the resultant urethane. For example, when a polyol such as pentaerythritol is employed, the amount of isocyanate is relatively lower; in contrast, when a polyol such as glycerine is employed, the amount of isocyanate can be higher. The isocyanate and the hydroxy-functional rosin ester can be employed in an equivalent ratio of 3:1 to 1:1 and preferably 2:1 to 1:1 of the hydroxyl group to the isocyanate group. The reaction can be conducted over a temperature range of about 70° to 160° C. and preferably 80° to 85° C. for a period of about 2 hours or until all or virtually all of the isocyanate has reacted. Residual isocyanate may be consumed with active hydrogen-containing compounds such as monoalcohols, e.g., 2-ethylhexanol and ethanolamine. Solvents such as hydrocarbons, ketones, esters or the like can be employed. Catalysts such as dibutyltin dilaurate or the like can be employed.

The resultant urethane-modified rosin ester in accordance with this invention typically contains from about 1 to 8 and preferably 1 to 5 percent by weight urethane content. By urethane content is meant the weight percent of the claimed rosin which is of the structure

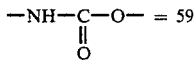

in the urethane-modified rosin ester based on its total weight.

The preferred urethane-modified rosin esters are characterized by high softening point, i.e., greater than 110° C., and good dilutability with hydrocarbon solvents. Softening point can be measured by a temperature gradient heat bar method, when appropriate. The urethane-modified rosin esters are ground into a fine powder and then deposited on a heat bar (Type 7841 KOFLER HEIZBANK by Reichert, Austria) having a temperature range from 50° C. to 260° C. The powdered urethane-modified rosin ester is deposited along the length of the bar, and ¼ inch in width. Softening point of the urethane-modified rosin ester is the temperature at which there is a sharp change from non-tacky to a tacky fluid form. This softening point is approximately equal to the softening point one obtains by the so-called ring and ball method.

By good dilutability is meant that the resultant urethane-modified rosin ester is highly compatible with hydrocarbon solvents such as "Magie Oils". A convenient method of testing dilutability of the urethane-modified rosin ester is as follows. Ten grams of the urethane-modified rosin ester at 52 percent solids in MAGIESOL-47 is 7.0 grams of MAGIESOL-47 to give a clear solution at room temperature (25° C.). MAGIESOL-47 is then added with stirring in increments. After each addition, the solution is allowed to stir for 10 minutes. The dilutability is registered by the amount of MAGIESOL-47 that is added before the solution turns from clear to hazy. The urethane-modified rosin esters of this invention have excellent dilutability, in that it takes at least 100 percent by weight of MAGIESOL-47 based on the weight of the starting weight of the urethane-modified rosin ester before the solution turns from clear to hazy.

In the practice of this invention as inks, the urethane-modified rosin esters are gelled to provide a gelled varnish. Gellants, preferably chemical gellants, are employed. Illustrative examples of the chemical gellants are aluminum alkoxylates such as methoxylated, ethoxylated or butoxylated aluminum derivatives. A specific but non-limiting example thereof is oxyaluminum octoate or aluminum isopropoxide. The gellants are employed in amounts sufficient to provide the ink with the proper rheology. If little or no gellant is added, inks made thereof will be ineffective on presses in that they would "fly-off" the press, i.e., mist excessively. If too much gellant is added, the ink would have excessive tack. This would result in paper picking. Typically, the amount of gellant ranges from about 1 to 10 percent by weight based on the weight of the urethane-modified rosin ester.

In the practice of this invention as ink formulations, especially fast conversion lithographic ink formulations, the urethane-modified rosin esters can be employed as the sole binder or in combination with other binders. The urethane-modified rosin ester can be used in combination with pigments, solvents and other ink additives. The pigments useful herein can be carbon black, phthalocyanine blue, titanium dioxide, rubine reds, hansa yellow and the like. Yet other additives such as plasticizers, rheology modifiers and the like can be employed.

In printing, the inks display good transfer and press stability and the printed inks dry rapidly and have excellent gloss, rub and blocking resistance, and notably squalene resistance. In addition, the inks exhibit little or no piling which allows for long runs without shut downs for cleaning of blankets and plates.

The following are non-limiting examples which further illustrate the invention.

EXAMPLE 1

This example illustrates the urethane-containing rosin ester of the invention and a method of preparing same.

| Ingredients | Parts by Weight |
|---|---|
| SYLVATAC-140[1] | 365 |
| Pentaerythritol | 45.3 |
| MAGIESOL-47[2] | 250.6 |
| SOLVESSO 150[3] | 12.0 |
| Toluene diisocyanate | 17.0 |

[1] A dimerized rosin containing 85% rosin dimer and 15% monomeric rosin available from Sylvachem Co.
[2] Available from Magie Bros., a Penzoil Co. division.
[3] Aromatic solvent, available from Shell Chemical Co.

The SYLVATAC-140 and the pentaerythritol were charged to a 5-liter kettle and heated to a temperature of 280°-300° C. and held thereat for about 7 hours until an acid value of about 22 was attained. Thereafter, cooling of the reaction product was commenced, followed by addition of the MAGIESOL-47 at about 205° C. The resultant mixture was cooled to 80° C. and the addition of toluene diisocyanate was commenced and carried out over a period of about 2 hours and at a temperature range of 80° C. to 85° C. About 6 hours thereafter, all of the isocyanate had reacted. The Gardner-Holdt viscosity was X+ (for 20 grams of resin diluted with 4.4 grams of toluene). The resin was thinned further with MAGIESOL-47 to produce a resin having a viscosity of 112,000 centipoise, total solids of 52.8 percent, acid number of 6.92 and hydroxyl number of 6.75.

EXAMPLE 2

A heat set gel varnish was prepared from a resin as described in Example 1 and the following ingredients.

| Ingredients | Parts by Weight |
| --- | --- |
| Urethane resin solution of Example 1 | 82 |
| Alkyd[1] | 11 |
| Oxyaluminum octoate | 4 |
| Tridecyl alcohol | 1 |
| MAGIESOL-47 | 2 |

[1]Number 7 body isophthalic-modified soya linseed oil alkyd.

The urethane resin of Example 1 and the alkyd were mixed and heated in a resin kettle to a temperature of 115° F. (46° C.). Thereafter, the oxyaluminum octoate was added over a period of about 1 minute; the resultant mixture was heated to 275° F. (135° C.) and held there for 20 minutes. Then the tridecanol and MAGIESOL-47 were added and the resultance mixture was allowed to cool to room temperature.

| | |
| --- | --- |
| Laray Viscosity[1] | 407 poises |
| Yield Value | 45,130 dynes/cm$^2$ |
| 1 Minute Tack[2] | 11.5 @ 1200 rpm |
| Tack Stability | = 2 minutes |

[1]ASTM D-4040-81.
[2]ASTM D-4361-06.1.

A red heat set lithographic ink was prepared from the above gel varnish as follows:

| Ingredients | Parts by Weight |
| --- | --- |
| Gel varnish from above | 58 |
| Wax Compound[1] | 4 |
| Flushed Red Pigment Base[2] | 30.0 |
| MAGIESOL-47 | 8 |

[1]A mixture of TEFLON and polyethylene waxes.
[2]Red flush base available from Sun Chemical D-19-2505.

The above were mixed to give an ink with a tack of 12.0 at 1 minute (viscosity 112 poises at 25° C., yield value of 6624 dynes/cm$^2$). Prints made on 50 pound consolidated insert stock on the "Little Joe Proof Press" dried on a SINVATROL drier at 390° F. (199° C.) at a speed of 22 feet per minute had the following density and gloss:

| Print No. | Density[3] | Gloss[4] |
| --- | --- | --- |
| 1 | 1.46 | 33.7 |
| 2 | 1.47 | 31.2 |
| 3 | 1.45 | 30.9 |
| 4 | 1.40 | |

[3]Optical Density - Cosar Smart Densitometer.
[4]60° Gloss - Gardner Glossmeter.

Squalene resistance was tested as follows. On a freshly printed matter as described above was deposited two drops of squalene, about two inches apart. Two minutes thereafter, using a neat pad of wiping tissue, the first drop of squalene was wiped across with a reasonable pressure against the printed area. Four minutes thereafter, the wiping action was repeated on the second drop of squalene. The wiping action was then repeated periodically at one-hour intervals. As aforestated, the printed ink of this invention displayed excellent squalene resistance after 1 hour of dry time.

EXAMPLE 3

This example further illustrates the urethane-containing rosin ester of the invention.

| Ingredients | Parts by Weight (grams) | |
| --- | --- | --- |
| SYLVATAC-140 | 1920 | Charge A |
| Trimethylolpropane | 428 | |
| Tolylene diisocyanate | 313 | Charge B |

Charge A, in a 5-liter flask, was heated to 280°–300° C. with removal of water until an acid number of 16 was obtained. The reaction was cooled to 200° C. and then 1006 grams of MAGIESOL-47 was added and the reaction further cooled to 80° C. Then, Charge B was added over a 90-minute period. The reaction was held at 85° C. for one hour after which time infrared analysis showed no absorption in the 2200–2500 cm$^{-1}$ range indicating a complete reaction of isocyanate. The reaction mixture was then thinned to 50 percent total solids using MAGIESOL-47. A mixture of 40 grams of the 50 percent total solids solution, 6.7 grams of MAGIESOL-47 and 3.3 grams of tridecylalcohol had a Gardner-Holdt viscosity of Z-7−.

ADDITIONAL EXAMPLES

Additional examples (including comparative examples) are presented hereinbelow in a tabular form to further illustrate the invention particularly as to the ratio of reactants and the effect thereof on some of the characteristics of the urethane containing hard resins of the invention. The method of the preparation of the resins of these examples was essentially the same as described hereinabove.

| Example | Rosin Dimer | Pentaerythritol | Toluene Diisocyanate | 4,4'-Diphenylmethane Diisocyanate | % —$\overset{O}{\overset{\|}{N}}$CO— | Solubility in MAGIESOL-47 |
| --- | --- | --- | --- | --- | --- | --- |
| Comparative (a) | 75.03 | 12.74 | 12.23 | — | 8.29 | Gel |
| 4 | 87.00 | 9.86 | 3.14 | — | 2.19 | Soluble |
| Comparative (b) | 81.74 | 11.13 | 7.13 | — | 4.83 | Gel |
| 5 | 85.80 | 9.72 | — | 4.48 | 2.11 | Soluble |

While the illustrative embodiments of the invention have been described hereinabove with particularity, it will be understood that various modifications will be apparent to and can be readily made by those skilled in the art without departing from the scope or spirit of the invention. Accordingly, it is intended that claims directed to the invention be construed as encompassing all aspects of the invention which would be treated as equivalents by those skilled in the art to which the invention pertains.

Therefore, what is claimed is:

1. A urethane-modified rosin ester comprising a reaction product of:
   (a) a hydroxyl-functional rosin esterification product of:
      (i) a rosin polyacid comprising a dimerized rosin,
      (ii) a polyfunctional alcohol;
   (b) an isocyanate.

2. A urethane-modified rosin ester of claim 1, wherein the dimerized rosin is in an amount ranging from about 15 to 85 percent or higher based on the weight of the acid functional reactant.

3. A urethane-modified rosin ester of claim 1, wherein the alcohol is a polyhydric alcohol.

4. A urethane-modified rosin ester of claim 3, wherein the alcohol is pentaerythritol, trimethylolpropane, glycerine, or mixtures thereof.

5. A urethane-modified rosin ester of claim 1, wherein the urethane is in an amount ranging from about 1 to 8 percent based on the total weight of the resin solids.

6. A urethane-modified rosin ester of claim 5, wherein the urethane is in an amount ranging from about 1 to 5 percent.

7. A urethane-modified rosin ester of claim 1, wherein the isocyanate is a polyisocyanate.

8. A urethane-modified rosin ester of claim 7, wherein the polyisocyanate is toluene diisocyanate, 4,4'-diphenylmethane diisocyanate, 4,4'-dicyclohexylmethane diisocyanate or polymerized 4,4'-diphenylmethane diisocyanate.

9. An ink composition comprising as a binder a urethane-modified rosin ester of claim 1.

10. A printing process for use in lithographic printing in which is employed ink as recited in claim 9 for printing a material which is squalene resistant.

11. A printed material obtained by the process according to claim 10.

* * * * *